Patented Aug. 8, 1944

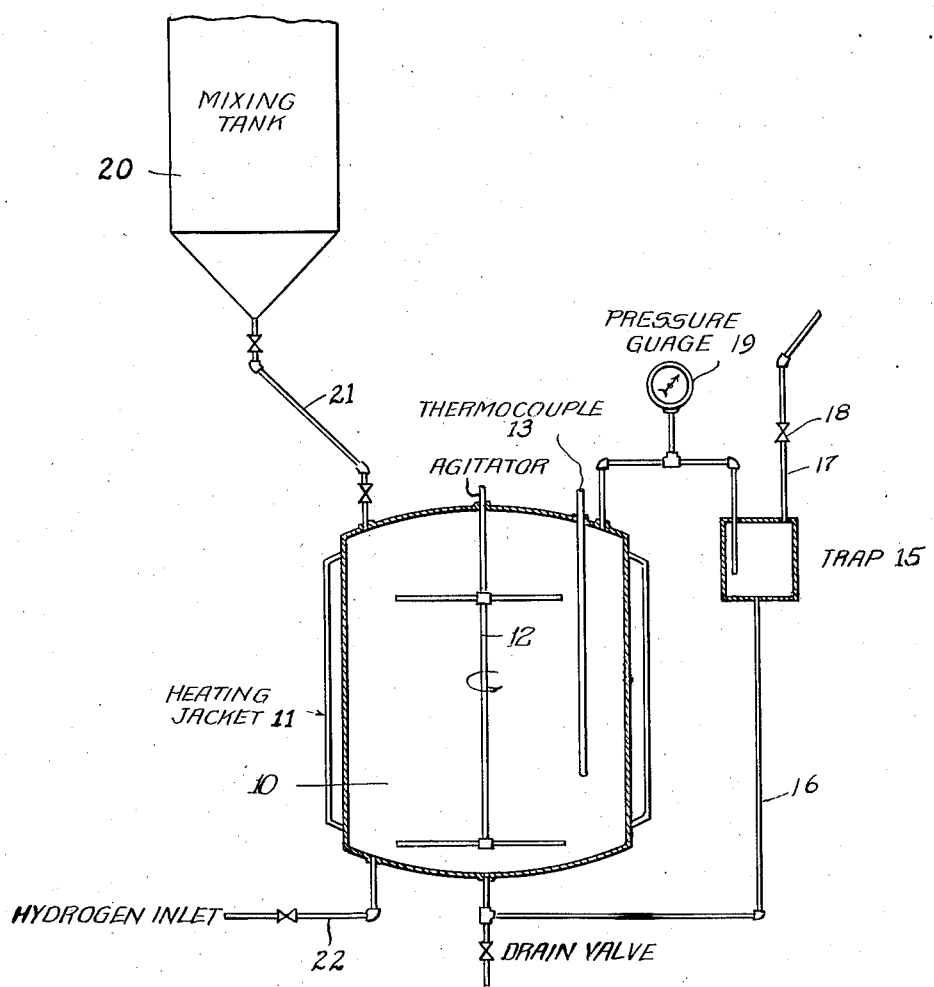

2,355,356

UNITED STATES PATENT OFFICE 2,355,356

PREPARATION OF AMINES

Hobart P. Young, Jr., Winnetka, Ill., assignor to Armour and Company, Chicago, Ill., a corporation of Illinois Application May 6, 1941, Serial No. 392,117

6 Claims. (Cl. 260—583)

This invention relates to the hydrogenation of aliphatic nitriles to produce amines of corresponding chain length, and deals particularly with processes which are selective to the formation of secondary and tertiary rather than primary amines.

The high molecular weight secondary amines are becoming of great commercial importance in many industrial fields, such as insecticides, the flotation of ores, and in many other commercial applications.

In the past there has been no satisfactory process known whereby secondary amines could be obtained directly from the nitriles, except in admixture with a major portion of primary amines. In the known processes for the hydrogenation of nitriles, invariably the product would be a mixture of primary, secondary and tertiary amines in which the primary amines were a very substantial constituent.

It is an important object of the invention to provide a process for treating nitriles with hydrogen which will yield a higher proportion of secondary amines. Another object is to provide such a process which is unfavorable to primary amines as an end product and which can be adjusted to yield secondary or secondary and tertiary amines in greater proportion. It is also desired that the reaction take place easily without the need for long holding periods.

I have discovered that secondary and tertiary amines can be selectively produced by providing a vent through which ammonia may escape during the reaction. The reactants should be kept under a suitable hydrogen pressure in order that the reaction go forward, but I have found that the reaction is greatly more favorable to the production of secondary and tertiary amines if the ammonia formed during reaction be permitted to escape while at the same time retaining sufficient hydrogen pressure to permit the reaction to go forward. This may be accomplished by providing a suitable vent. This feature and other features of the invention will be more clearly explained in the following detailed description.

One type of apparatus which may be used in practicing the invention is illustrated schematically in the accompanying drawing.

As shown, the apparatus includes a pressure tank 10 equipped with a heating jacket 11 which will receive a suitable heating fluid for maintaining the tank and its contents at a desired temperature. An agitator 12, which may be powered by an electric motor or other suitable means, is provided for maintaining the tank contents under agitation during the treatment. A thermo-couple designated 13 serves for indicating the temperature being maintained.

A line 14 leads from the top portion of tank 10 into a trap 15, and the line 16 leads from the trap back to the bottom of the tank. The line 17 provided with valve 18 leads from the upper portion of the trap to the atmosphere. A gage 19 is provided to indicate the pressure being maintained in the system.

In carrying out the improved process using the illustrated apparatus, the nitrile is mixed with a quantity of catalyst in the mixing tank 20, and the mixture discharged through the valve-equipped line 21 into the reaction tank 10. The catalyst may be any suitable hydrogenating catalyst, and preferably should be a nickel catalyst produced through reduction of a nickel salt, for example, nickel formate.

Heating fluid is then admitted to the heating jacket and the agitator started. When the reaction temperature has been reached, hydrogen is admitted under pressure through line 22. Though the invention may be practiced at any temperature which will produce reaction, it is a further feature of the invention that the temperature be maintained between 200° C. as a lower limit and about 250° C. or as high as can be had without causing objectionable cracking, as the upper limit. I have found that this range of temperatures is more favorable to rapid production of secondary and tertiary amines than are the ordinary temperatures below this range.

The pressure produced by introduction of hydrogen may be any pressure which is sufficient to permit the reaction to proceed. With generous venting of gases from the reaction chamber, the pressure may be about 50 pounds per square inch or lower, but suitable operation is obtained at much higher pressures such as 200 pounds per square inch or higher. It is yet another feature of my invention to start the reaction at higher pressures, preferably above 150 pounds per square inch, and after the reaction has started, or during the latter part of the reaction, reducing the pressure. Suitably after the reaction has proceeded in part, the vent may be opened to the atmosphere allowing the pressure to decrease to substantially zero or atmospheric pressure. I find that this practice is more favorable to the production of secondary amines.

During the treatment with hydrogen gas the resulting gases may escape through the line 14, and any entrained matter is caught in the trap 15 and so returned to the system. The gases immerging from trap 15 pass off to the atmosphere. The valve 23 serves to regulate the quantity which is permitted to pass off. It is to be understood that the desired pressure for reaction is to be maintained at the same time as venting takes place.

If desired, the hydrogen gas may be admitted to the tank 10 after reaction temperature has been attained and during the time the reactants reach the preferred temperature.

The nitriles used in forming secondary amines according to the improved processes, may be prepared, for example, by hydrolyzing oil, such as cottonseed oil, or soya bean oil, to produce glycerine and mixed fatty acids, and then reacting the fatty acids with ammonia to produce the nitriles. Desirably, the acids obtained upon hydrolysis may be fractionally distilled, and a fraction having a certain boiling range recovered. This recovered fraction may then be subjected to reaction with ammonia to form nitriles. Suitably, the fatty acids themselves may be hydrogenated before reaction with ammonia and the hydrogenated nitriles so formed then subjected to the hydrogenation treatment herein set forth to produce secondary amines. Any suitable method may be employed for producing the nitriles for use in this hydrogenation reaction.

While I do not wish to be bound by any theory which may be set forth in an attempt to explain the improved results obtained by the processes herein given, the following formulas may be helpful in explanation:

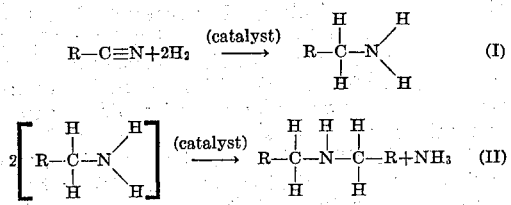

It is believed that the reaction to form secondary amines involves two portions, the first of which is represented by Equation I and the last of which is represented by Equation II. Equation I involves the union of the nitrile with hydrogen in which the result is a primary amine, and Equation II involves the completion of the reaction where two molecules unite to produce secondary amines with ammonia being released. In each of these equations R represents an aliphatic radical which in substantially all instances will contain six or more carbon atoms. Another possibility is that the secondary and primary combine to form tertiary amines according to the following Equation III:

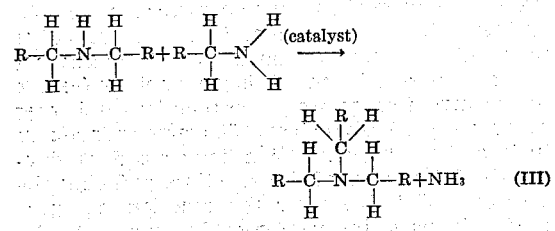

From these formulas it is seen that the latter portion of the reaction forming the secondary or tertiary amine end product involves the throwing off of ammonia. The fact, as discovered by this invention, that the removal of ammonia as the reaction takes place through a suitable venting means makes the process favorable to secondary amine production would seem to indicate that any building up of large quantities of ammonia in the reaction zone tends to inhibit the secondary and tertiary amine formation.

The following examples set forth very specific ways in which the invention may be practiced, but it is clearly understood that many other specific modes differing widely from examples here given can be used within the contemplation of the invention.

*Example I*

110 pounds of crude nitriles which were prepared from hydrogenated fatty acids obtained by hydrolysis of cottonseed oil were placed in a mixing tank, and 2.43 pounds of nickel formate catalyst was added. This mixture contained 0.57% of nickel on the basis of the total charge in the tank. The nitriles and catalyst were thoroughly mixed and run into the reaction tank where they were heated to 146° C. Hydrogen was admitted until a pressure of 140 pounds per square inch was obtained. The vent valve was then adjusted to permit gas to pass through at a rate of about 175 cubic feet per hour. The reaction was allowed to proceed for one hour, at the end of which time the temperature was 236° C. The stream of hydrogen was admitted for one hour longer, at which time the temperature was 210° C. The charge was then removed from the reaction tank and filtered. Analysis showed 1.7% primary amines, 2.6% hydrocarbons and nitrile, and 95% of non-volatile material predominantly secondary amines.

*Example II*

440 pounds of crude nitriles prepared from the hardened fatty acids obtained by hydrolysis from cottonseed oil were mixed in a mixing tank with 10 pounds of nickel formate catalyst (corresponding to 0.54% nickel on the basis of the total charge in the tank). The mixture was run into the reaction tank and heated to 150° C. Hydrogen was admitted until the pressure rose to 140 pounds per square inch and the vent valve was adjusted to permit the escape of 800 cubic feet of gas per hour. The reaction was allowed to proceed for 1¼ hours and the temperature rose to 265° C. The reaction then proceeded for another hour and the temperature decreased to 230° C., after which the charge was removed from the reaction tank and filtered. The yield was about 98.4% of non-volatile material constituting substantially pure secondary amines.

*Example III*

75 pounds of crude nitriles, which were prepared from hydrogenated fatty acids obtained by hydrolysis of cottonseed oil, were placed in a mixing tank, and 1.7 pounds of nickel formate catalyst added. This mixture contained 0.52% of nickel on the basis of the total charge in the tank. The nitriles and catalyst were thoroughly mixed and run into the reaction tank where they were heated to 150° C. Hydrogen was admitted until a pressure of 180 pounds per square inch was obtained. This pressure was maintained for ¾ of an hour, the hydrogen shut off and the vent opened so that the pressure was reduced to zero gauge. The charge was held for 2 hours at 235–240° C., the vent open. The charge was then removed from the reaction tank and filtered. Analysis showed 3.1% primary amine, 5.0% hydrocarbon and nitrile, and 92.1% of non-volatile material, predominantly secondary amines.

Example IV 106 pounds of crude nitriles, which were prepared from the crude fatty acids obtained on the hydrolysis of beef tallow were placed in a mixing tank and 2.43 pounds of nickel formate catalyst was added. This mixture contained 0.53% nickel on the basis of the total charge in the tank. The nitriles and catalyst were thoroughly mixed and run into the reaction tank where they were heated to 157° C. Hydrogen was admitted until a pressure of 110 pounds per square inch was obtained. The vent valve was adjusted to permit gas to pass through at a rate of 200 cubic feet per hour. The reaction was allowed to proceed for ¾ hour, at the end of which time the temperature was 257° C. The stream of hydrogen was admitted for 1 hour longer, at which time the temperature was 215° C. The charge was then removed from the reaction tank and filtered. Analysis showed less than 2% primary amine, and the balance predominantly secondary amine.

Example V 500 pounds of crude nitriles, which were prepared from the crude fatty acids obtained on the hydrolysis of beef tallow, were placed in a mixing tank and 16.6 pounds of nickel formate catalyst added. This mixture contained 0.76% nickel on the basis of the total charge in the tank. The nitriles and catalyst were thoroughly mixed and run into the reaction tank where they were heated to 146° C. Hydrogen was admitted until a pressure of 60 pounds per square inch was obtained and a vent of 500–1000 cubic feet per hour adjusted. The reaction was allowed to proceed for 1 hour, at the end of which time the temperature was 205° C. The stream of hydrogen was admitted for 2 hours longer, at which time the temperature was 171° C. The charge was removed from the reaction tank and filtered. Analysis showed 6% primary amine, 9% hydrocarbon and nitrile, and 85% secondary and tertiary amine.

I claim:

1. In the process of hydrogenating aliphatic nitriles to amines, the method of increasing the yield of amines having at least two alkyl radicals which comprises removing gaseous ammonia from the reaction zones as the hydrogenation of the nitriles proceeds.

2. In the process of hydrogenating aliphatic nitriles to amines, the method of increasing the yield of secondary amines which comprises removing gaseous ammonia from the reaction zone as the hydrogenation of the nitriles proceeds.

3. In the process of hydrogenating aliphatic nitriles to amines, the method of increasing the yield of amines having at least two alkyl radicals which comprises partially hydrogenating the nitriles under hydrogen pressure, reducing the pressure with removal of gaseous reaction products and then continuing the hydrogenation of the nitriles while removing gaseous ammonia from the reaction zone as the hydrogenation proceeds.

4. In the process of hydrogenating aliphatic nitriles to amines, the method of increasing the yield of secondary amines which comprises partially hydrogenating the nitriles under hydrogen pressure, reducing the pressure with removal of gaseous reaction products and then continuing the hydrogenation of the nitriles while removing gaseous ammonia from the reaction zone as the hydrogenation proceeds.

5. In the process of hydrogenating aliphatic nitriles to amines, the method of increasing the yield of amines having at least two alkyl radicals which comprises contacting said nitriles with hydrogen gas in a confined zone to produce a reaction between said nitriles and hydrogen, passing vaporous and entrained matter containing ammonia formed as a result of said reaction into a second zone which serves as a trap, passing liquid from said second zone again to said first mentioned zone, and withdrawing gases from said second zone.

6. In a process for hydrogenating aliphatic nitriles to amines, the step of contacting the nitriles and hydrogen in a confined zone containing a nickel catalyst while maintaining said zone under elevated pressure and while withdrawing gaseous ammonia from said zone.

HOBART P. YOUNG, Jr.